(12) United States Patent
Jones et al.

(10) Patent No.: US 7,774,274 B2
(45) Date of Patent: Aug. 10, 2010

(54) PAYMENT CARD PROCESSING SYSTEM AND METHODS

(75) Inventors: Peter Jones, Baildon (GB); Jim Mitchell, Lichfield (GB); Mike Brumfitt, Ilkley (GB); Deborah Falkingbridge, Holmfirth (GB); Robert Humphreys, Leeds (GB); Stewart MacPhail, Princess Risborough (GB); Jeremy Schreurs, London (GB); Amanda Atherton, Albans (GB); Ros Marshall, Leeds (GB); Lockie Carolan, Leeds (GB); Jeffrey V. Manchester, Westport, CT (US); Paul F. Richards, Schednectady, NY (US)

(73) Assignee: General Electric Capital Corporation, Stamford, CT (US)

( * ) Notice: Subject to any disclaimer, the term of this patent is extended or adjusted under 35 U.S.C. 154(b) by 1408 days.

(21) Appl. No.: 10/656,798

(22) Filed: Sep. 5, 2003

(65) Prior Publication Data

US 2004/0117300 A1 Jun. 17, 2004

Related U.S. Application Data

(63) Continuation of application No. 09/593,199, filed on Jun. 14, 2000, now Pat. No. 6,915,277.

(60) Provisional application No. 60/202,980, filed on May 10, 2000.

(51) Int. Cl.
*G06Q 40/00* (2006.01)
*G07F 19/00* (2006.01)
(52) U.S. Cl. .................................................. 705/39
(58) Field of Classification Search ............ 705/30, 705/39
See application file for complete search history.

(56) References Cited

U.S. PATENT DOCUMENTS 4,432,567 A * 2/1984 Stockburger et al. .......... 283/83

(Continued)

FOREIGN PATENT DOCUMENTS

EP 0 658 862 A2 6/1995

(Continued)

OTHER PUBLICATIONS

Kmart MasterCard (Sep. 26, 2000), www.cardweb.com/cardtrak/news/2000/september/26a/html.*

(Continued)

*Primary Examiner*—Hani Kazimi
*Assistant Examiner*—William E Rankins
(74) *Attorney, Agent, or Firm*—Buckley, Maschoff & Talwalkar LLC

(57) ABSTRACT

A payment card processing system and method is provided that allows an account holder to upgrade a private label card to a dual card. The dual card may be used for both private label transactions and bankcard transactions. Methods for upgrading to the dual card account include selecting a private label account having associated monetary and non-monetary data and maintained on a first processing platform for upgrade to a dual card account, creating the dual card account on a second processing platform, transferring the non-monetary data associated with the private label account from the first processing platform to the second processing platform for association with the dual card account, and initiating a trailing activity process to identify monetary and non-monetary activity associated with the private label account and update a cross reference table to associate the trailing activity with the dual card account.

20 Claims, 9 Drawing Sheets

U.S. PATENT DOCUMENTS

| | | | |
|---|---|---|---|
| 4,813,077 A * | 3/1989 | Woods et al. | 382/138 |
| 5,193,114 A | 3/1993 | Moseley | |
| 5,231,569 A * | 7/1993 | Myatt et al. | 705/38 |
| 5,255,182 A * | 10/1993 | Adams | 705/17 |
| 5,276,311 A * | 1/1994 | Hennige | 235/380 |
| 5,307,121 A * | 4/1994 | Johnson | 399/315 |
| 5,308,121 A * | 5/1994 | Gunn | 283/99 |
| 5,506,395 A * | 4/1996 | Eppley | 235/486 |
| 5,530,232 A * | 6/1996 | Taylor | 235/380 |
| 5,544,246 A * | 8/1996 | Mandelbaum et al. | 705/65 |
| 5,578,808 A * | 11/1996 | Taylor | 235/380 |
| 5,585,787 A * | 12/1996 | Wallerstein | 340/5.42 |
| 5,649,118 A * | 7/1997 | Carlisle et al. | 705/41 |
| 5,748,737 A | 5/1998 | Daggar | |
| 5,770,843 A | 6/1998 | Rose et al. | |
| 5,826,243 A | 10/1998 | Musmanno et al. | |
| 5,844,230 A * | 12/1998 | Lalonde | 235/487 |
| 5,859,419 A * | 1/1999 | Wynn | 235/487 |
| 5,864,830 A | 1/1999 | Armetta et al. | |
| 5,883,377 A | 3/1999 | Chapin, Jr. | |
| 5,914,472 A | 6/1999 | Foladare et al. | |
| 5,945,653 A * | 8/1999 | Walker et al. | 235/380 |
| 5,955,961 A * | 9/1999 | Wallerstein | 340/5.4 |
| 5,984,191 A | 11/1999 | Chapin, Jr. | |
| 6,024,286 A * | 2/2000 | Bradley et al. | 235/492 |
| 6,032,136 A * | 2/2000 | Brake et al. | 705/41 |
| 6,032,186 A * | 2/2000 | Hernandez et al. | 709/227 |
| 6,038,552 A * | 3/2000 | Fleischl et al. | 705/44 |
| 6,047,067 A | 4/2000 | Rosen | |
| 6,047,267 A | 4/2000 | Owens et al. | |
| 6,131,810 A * | 10/2000 | Weiss et al. | 235/379 |
| 6,138,917 A | 10/2000 | Chapin, Jr. | |
| 6,145,739 A | 11/2000 | Bertina et al. | |
| 6,163,771 A | 12/2000 | Walker et al. | |
| 6,189,787 B1 * | 2/2001 | Dorf | 235/380 |
| 6,205,553 B1 | 3/2001 | Stoffel et al. | |
| 6,220,510 B1 | 4/2001 | Everett et al. | |
| 6,224,109 B1 * | 5/2001 | Yang | 283/77 |
| 6,315,195 B1 | 11/2001 | Ramachandran | |
| 6,327,348 B1 | 12/2001 | Walker et al. | |
| 6,353,811 B1 | 3/2002 | Weissman | |
| 6,354,490 B1 * | 3/2002 | Weiss et al. | 235/379 |
| 6,427,909 B1 | 8/2002 | Barnes et al. | |
| 6,431,443 B1 | 8/2002 | Barnes et al. | |
| 6,575,361 B1 * | 6/2003 | Graves et al. | 235/380 |
| 6,615,190 B1 | 9/2003 | Slater | |
| 6,631,849 B2 * | 10/2003 | Blossom | 235/492 |
| 6,732,919 B2 * | 5/2004 | Macklin et al. | 235/380 |
| 6,742,704 B2 * | 6/2004 | Fitzmaurice et al. | 235/380 |
| 6,805,287 B2 * | 10/2004 | Bishop et al. | 235/379 |
| 6,915,277 B1 * | 7/2005 | Manchester et al. | 705/39 |
| 7,254,557 B1 * | 8/2007 | Gillin et al. | 705/40 |
| 2001/0032192 A1 | 10/2001 | Putta et al. | |
| 2001/0048023 A1 | 12/2001 | Fitzmaurice et al. | |
| 2002/0029191 A1 | 3/2002 | Ishibashi et al. | |
| 2002/0095386 A1 | 7/2002 | Maritzen et al. | |
| 2002/0138309 A1 * | 9/2002 | Thomas, Jr. | 705/4 |
| 2002/0138428 A1 * | 9/2002 | Spear | 705/41 |
| 2002/0156723 A1 * | 10/2002 | Lilly et al. | 705/38 |
| 2002/0174016 A1 * | 11/2002 | Cuervo | 705/16 |
| 2003/0111527 A1 * | 6/2003 | Blossom | 235/380 |
| 2003/0139978 A1 * | 7/2003 | Fisher et al. | 705/26 |
| 2003/0155416 A1 * | 8/2003 | Macklin et al. | 235/380 |
| 2003/0191709 A1 | 10/2003 | Elston et al. | |
| 2003/0204470 A1 | 10/2003 | Manchester et al. | |
| 2004/0049452 A1 * | 3/2004 | Blagg | 705/39 |
| 2004/0054622 A1 * | 3/2004 | Strayer et al. | 705/39 |
| 2004/0083184 A1 * | 4/2004 | Tsuei et al. | 705/74 |
| 2004/0254837 A1 * | 12/2004 | Roshkoff | 705/14 |
| 2005/0021456 A1 * | 1/2005 | Steele et al. | 705/39 |
| 2005/0035192 A1 * | 2/2005 | Bonalle et al. | 235/379 |
| 2005/0035847 A1 * | 2/2005 | Bonalle et al. | 340/5.61 |
| 2006/0131396 A1 * | 6/2006 | Blossom | 235/380 |

FOREIGN PATENT DOCUMENTS

| | | |
|---|---|---|
| WO | WO 89/11130 A1 | 11/1989 |
| WO | WO 98/25237 A1 | 6/1998 |
| WO | WO 00/33497 A2 | 6/2000 |
| WO | WO 01/03033 A1 | 1/2001 |
| WO | WO 02/47022 A1 | 6/2002 |

OTHER PUBLICATIONS

"Kmart Platinum Rocks", Feb. 25, 2003, www.cardoffers.com/introComments/posted/card.asp?idmin=1751&refid=se20243&offset=30.*

"The Fight for Retail Credit", Credit Card Management. New York: Dec. 2000. vol. 13, Iss. 9: p. 40, 6 pgs. Jason Fargo.*

Store card software gets dressed up Lucas, Peter. Credit Card Management. New York: Sep. 1995.*

Industry Briefs Card News. Potomac: Dec. 22, 1997. vol. 12, Iss. 25.*

The Plastic Store Punch, Linda. Credit Card Management. New York: Apr. 1992.*

The fight for retail credit Jason Fargo. Credit Card Management. New York: Dec. 2000.*

Kmart MasterCard (Sep. 26, 2000), Cardweb.com.*

"Kmart Platinum Rocks!", Cardoffers.com Feb. 25, 2003, Jazzy Jazz.*

The fight for retail credit Jason Fargo. Credit Card Management. New York: Dec. 2000. vol. 13, Iss. 9.*

Retail cards seek wallet share Kenneth L Tye. Chain Store Age. New York: Feb. 2001. vol. 77, Iss. 2.*

The fight for retail credit Jason Fargo. Credit Card Management. New York: Dec. 2000. vol. 13, Iss. 9; p. 40, 6 pgs.*

Retail cards seek wallet share Kenneth L Tye. Chain Store Age. New York: Feb. 2001. vol. 77, Iss. 2; p. 72, 2 pgs.*

Industry Briefs Card News. Potomac: Dec. 22, 1997. vol. 12, Iss. 25; p. 1.*

Kmart Platinum Rocks, Feb. 25, 2003, www.cardoffers.comlintroCommentslpostedlcard.asp?idmin= 1751&refid=se20243&offset=30.*

Kmart MasterCard (Sep. 26, 2000), www.cardweb.comlcardtraklnews120001september126alhtml.*

"Supplementary European Search Report of the European Patent Office", mailed Mar. 20, 2007 for EP 03749468.9-1238 PCT/US0327929, 3pgs.

"PCT Notification of Transmittal of the International Search Report or the Declaration", dated May 4, 2004 for PCT/US03/27929, 5pgs.

"Non-Final Office Action for U.S. Appl. No. 09/593,199, filed Jun. 14, 2000", Jeff Manchester, 17pgs.

* cited by examiner

PAYMENT CARD PROCESSING SYSTEM AND METHODS

CROSS REFERENCE

This application is a continuation of, and claims priority to, U.S. patent application Ser. No. 09/593,199 entitled "Method for a Dual Credit Card System" and filed Jun. 14, 2000 now U.S. Pat. No. 6,915,277, which is based on, and claims priority to, U.S. provisional Patent application Ser. No. 60/202,980, entitled "Method for a Dual Credit Card System" and filed May 10, 2000, the contents of both of which are herein incorporated by reference for all purposes.

BACKGROUND

Embodiments of the present invention relate to a payment card processing system and method. More particularly, embodiments relate to a payment card processing system that allows a payment card to be used on two different payment networks.

A number of different types of payment card are available. For example, one common type of payment card is a credit card or bankcard issued by a bank or other financial institution. Many credit cards are issued pursuant to the rules of one or more credit card associations. For example, banks issue credit cards pursuant to the rules of associations or companies such as VISA®, MasterCard®, DISCOVER® or American Express® (e.g., for their Optima® brand cards). The bank that issues the credit card is referred to as the "issuer" of the card. Transactions using the card are routed through the "bankcard networks". The routing typically depends on the card association under which the card is issued (e.g., a credit card issued pursuant to the MasterCard® rules will typically be routed using the MasterCard® processing networks).

These credit cards allow a cardholder to purchase goods and services at a wide number of merchant locations. Credit cards allow cardholders to pay off charges on a monthly basis or a cardholder may choose to pay a portion of the outstanding balance each month. Any unpaid balance typically is subject to interest charges. The cardholder may pay an annual fee as well. Often, issuers of these credit cards provide a number of different levels of card. For example, a bank may issue credit cards ranging from a standard card, to premium cards such as a "Gold Card" or a "Platinum Card". Each level may have different annual charges, different interest rates, and different cardholder services. The issuer issues each account with a credit limit depending upon the credit worthiness of the cardholder. Each transaction conducted with the card may involve one or more interchange fees paid to the credit card association. For example, a merchant may be assessed an interchange fee based upon a percentage of the amount of each transaction conducted using a credit card.

A second type of card is a "charge card" such as the American Express® series of charge cards. Charge cards allow cardholders to charge purchases and services to the account. The cardholder is expected to pay the balance in full monthly. There is usually no interest charged. Charge cards often have a higher account limit than credit cards. This limit often is established based on a cardholder's usage history. There is an annual fee paid by the cardholder and the merchant typically is assessed an interchange fee. For example, the interchange fee assessed by American Express is usually higher than the interchange fee assessed by other bankcard networks. Charge card and bankcard transactions are typically processed using bankcard networks (such as those operated by VISA®, MasterCard®, American Express®, etc.).

A third type of card is a "private label" credit card. A private label credit card is a payment card issued by (or in conjunction with) a merchant such as Wal-Mart, Harrods, Sears, or Brooks Brothers. Some private label cards are issued and serviced by the merchant, while others are issued and serviced by a financial institution acting in conjunction with the merchant. From the cardholder's perspective, a transaction involving a private label card is similar to a transaction involving a bankcard or charge card—the cardholder presents the card for payment at a merchant and is later invoiced for the transaction. However, unlike most bankcard or charge cards, a private label card can only be used at merchant locations associated with the sponsoring merchant. For example, a Sears private label card can only be used for purchases at Sears (or designated Sears affiliates).

A private label cardholder may be required to pay the monthly balance in full (similar to a charge card) or may be allowed to revolve or carry a balance (similar to a credit card). The merchant pays the financial institution a fee similar to the interchange fee of a bankcard. This fee is usually lower than the interchange fee associated with bankcard transactions. The networks that are used to process private label card transactions are frequently different than the networks that are used to process bankcard transactions. For example, a private label card transaction is typically routed through a closed network or a limited access network that has been established or configured specially for a particular private label merchant. This limited access provides some benefits to private label cardholders. For example, private label merchants are able to offer incentives, promotions, and enhanced statement details which are better in many respects to those available through the bankcard networks.

Consumers enjoy the convenience and value-added services associated with these various types of payment cards. However many consumers find that they have too many payment cards, because they are attracted to the different benefits available from different types of payment cards. One advantage of the private label card is the availability of special promotional financing offers (such as "no interest for x months" promotions) and merchandise information from the issuer or associated merchant of the private label credit card. The primary advantage of the bankcard is the almost universal acceptance world wide of a VISA® card, MasterCard®, or DISCOVER® card. These cards also typically have lower interest rates.

Many merchants prefer that their customers use their private label card so that the merchant can use the monthly mailings as a vehicle of developing customer loyalty through special offers and other merchandising efforts. Merchants also prefer not to pay the higher interchange fees associated with generally available bankcards or the American Express® card. Merchants also like the idea of a dedicated credit line for use in their retail store. However, many customers are reluctant to carry any more plastic in their wallets than absolutely necessary.

A number of solutions to this problem have been suggested, including the issuance of payment cards which have multiple magnetic stripes (each encoded with different account numbers for each card replaced), magnetic stripes encoded with multiple account numbers, smart cards storing account information for each different account to be accessed, etc. None of these solutions provide a desirable solution to the technical problem of allowing a single payment card to provide features of different products. The technical problem is exacerbated by the fact that different types of payment cards may be routed using different networks having different protocols. Further, different accounts may be hosted on, or processed using, different processing platforms. Accordingly, there is a need for a payment card that provides merchants, cardholders, and issuers the benefits of both a bankcard and a private label card and which can be routed and used with existing bankcard and payment card networks and processing platforms.

SUMMARY

To alleviate problems inherent in the prior art, the present invention introduces systems, methods, apparatus, computer program code and means for upgrading accounts, including selecting a private label account maintained on a first processing platform for upgrade to a dual card account, the private label account associated with an account holder and having associated monetary and non-monetary data; creating the dual card account with a zero balance on a second processing platform; transferring the non-monetary data associated with the private label account to the second processing platform for association with the dual card account; and causing a dual card associated with the dual card account to be transmitted to account holder, the dual card and the dual card account being inactive until activated. Pursuant to some embodiments, private label accounts can be upgraded individually (e.g., at the request of a cardholder) or in groups. Pursuant to some embodiments, an activation process is provided to transfer monetary data associated with the private label account to the dual card account. Pursuant to some embodiments, a trailing activity process is provided to ensure that monetary and non-monetary transactions associated with the private label account are reflected in the dual card account.

Pursuant to some embodiments, systems, methods, apparatus, computer program code and means for processing an application for a new account are provided, including receiving an application for a new account, the application including sponsoring merchant information, customer information and a proposed transaction amount; performing a credit analysis based on the customer information; determining, based at least in part on the credit analysis, to issue one of a private label card and a dual card to the customer; communicating an approval to the customer; providing a temporary card to the customer, the temporary card having an account number associated with one of the private label card and the dual card and available for purchases at the sponsoring merchant; charging the transaction amount using the temporary card.

Pursuant to some embodiments, systems, methods, apparatus, computer program code and means for activating an account are provided, including receiving, from a customer, a request to activate a dual card; updating a risk profile of the customer; confirming that the customer remains eligible for the dual card; confirming that the customer desires to activate the dual card; and transferring monetary data from a private label processing platform to a dual card processing platform to complete an activation of the dual card account.

Pursuant to some embodiments, systems, methods, apparatus, computer program code and means for routing a transaction are provided, including generating an authorization request, the request including a transaction amount and an account identifier, the account identifier including a portion identifying an issuer of the account and a portion identifying a type of the account; routing the authorization request to the issuer via a first authorization network if the account identifier indicates that the account is a first type of account; and routing the authorization request to the issuer via a second authorization network if the account identifier indicates that the account is a second type of account.

With these and other advantages and features of the invention that will become hereinafter apparent, the invention may be more clearly understood by reference to the following detailed description of the invention, the appended claims, and the drawings attached herein.

DETAILED DESCRIPTION

Figure 1:
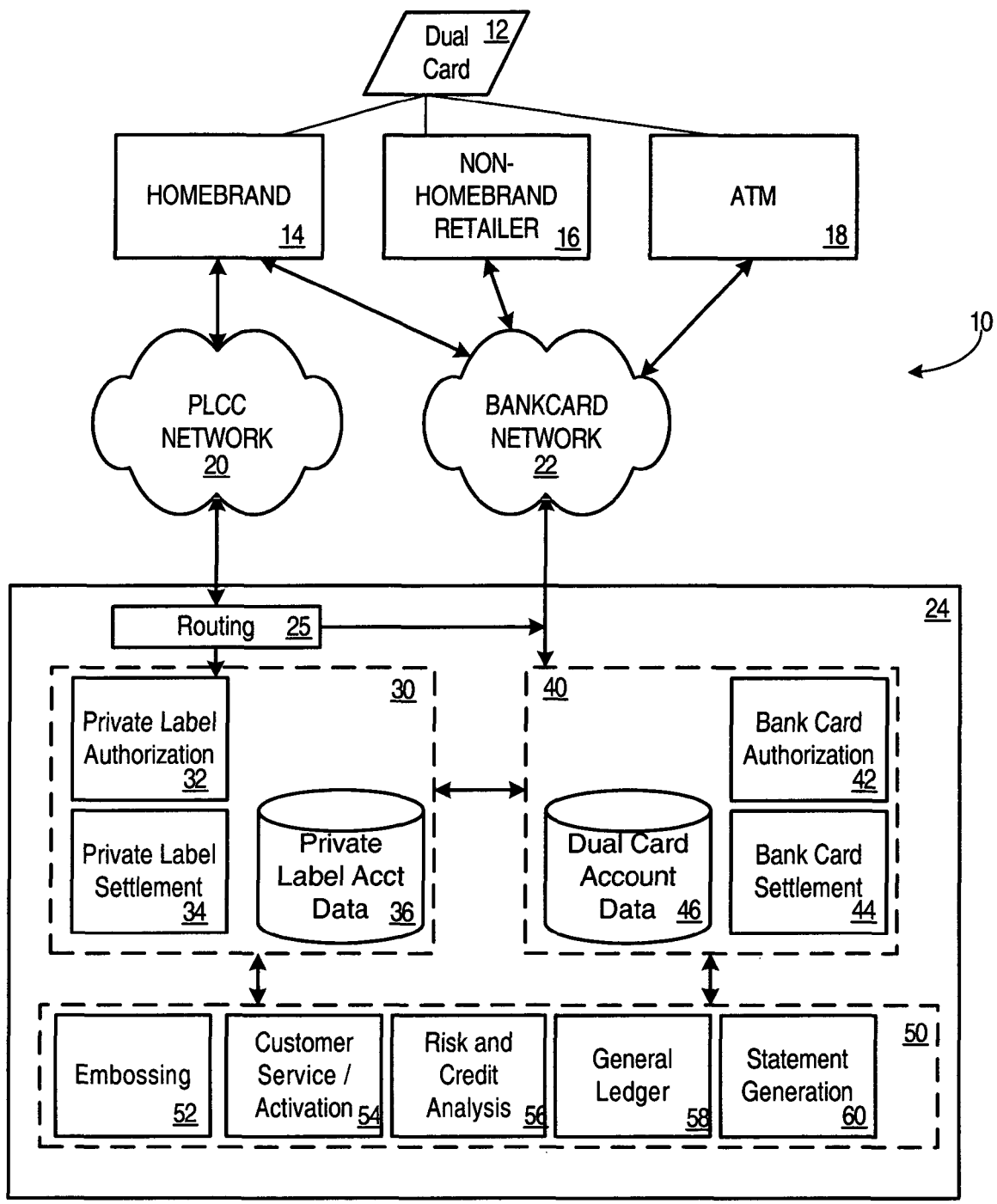
FIG. 1 is a block diagram depicting a payment card system pursuant to some embodiments of the present invention.

Some embodiments described herein are associated with "payment cards". As used herein, the term "payment card" is used to refer to a financial transaction card that is issued by a financial institution (the "issuer") to a customer (the "cardholder") for use in conducting transactions to be charged or credited to a financial account (the "card account"). As will be discussed further, as used herein, several types of payment cards may be used, including a "dual card" introduced herein (which combines features of different types of payment cards), a "bankcard" and a "private label card". As used herein, a "private label card" is a payment card which is issued by (or in conjunction with) a sponsoring merchant (the "private label merchant" or the "homebrand") and which can only be used for purchases at sponsoring merchant locations.

As used herein, a dual card (similar to a bankcard) has at least two identifiers associated with it: a primary account number (identifying the financial account accessed by the card), and a card number embossed on, or otherwise associated with the card (and including a bank identification number or BIN). For simplicity, both of these identifiers may generally be referred to herein as the "account identifier" associated with the dual card. In some embodiments, BINs are selected in a manner that identifies a payment card as a dual card product. In some embodiments, BINs are further selected to identify the particular homebrand merchant associated with a dual card. This information may be used to appropriately route and process transactions involving dual cards, as will be described further below. As used herein, the term "dual card" is used to refer to a payment card product that has functionality as a private label card and as a bankcard. In some embodiments, each dual card is associated with a dual card account. In some embodiments, where a private label account is upgraded to become a dual card account, the same account is used (that is, the cardholder does not receive a new account relationship with the issuer, instead, the cardholder receives a new card to access the existing account As used herein, the term "bankcard" refers to a credit, debit or charge card which is associated with a "bankcard network". As used herein, the term "bankcard network" refers to processing networks established and/or operated on behalf of bankcard issuers or associations such as, for example, the networks operated by (or on behalf of) Visa International Service Association (or "VISA®"), MasterCard International®, American Express®, etc. Other bankcard networks include regional or local networks that may operate in conjunction with other bankcard networks (e.g., such as the Plus network or the Switch network). In general, as used herein, the term "bankcard network" refers to any of these types of networks or other networks that are used to route and process bankcard transactions at multiple merchant locations and cash machines (e.g., such as merchant locations accepting VISA or MasterCard branded payment cards).

As used herein, the term "private label network" is used to refer to processing networks that are established and/or operated on behalf of particular private label card programs. For example, a retailer may operate a private label network to process private label card transactions made at any of its retailer locations. As another example, a retailer may contract with a merchant acquirer or other processing entity to operate a private label network for the retailer. Typically, these private label networks allow a number of processing features that are not available for transactions conducted using bankcard networks. For example, many private label networks allow the capture and transmission of "enhanced data" or item level details associated with purchases. As another example, many private label networks allow the application of loyalty and promotional programs.

Embodiments provide a payment card processing system that enables a single payment card to be processed over both private label and bankcard networks. Pursuant to some embodiments, a system, method, apparatus, means and computer program code are provided for processing a payment card transaction which utilizes a card (referred to herein as a "dual card" or a "dual credit card" or a "dual purpose card") which is issued to a cardholder and which is issued in conjunction with both a sponsoring merchant (the "private label merchant" or the "homebrand merchant") and a sponsoring bankcard association (e.g., such as VISA® or MasterCard®). Each dual card is associated with a single account having an account identifier. Each transaction using the dual card is processed based on the account identifier. For transactions conducted at a merchant location that is a private label merchant, the account identifier will cause the transaction to be processed using a private label processing network. For transactions conducted at a merchant location that is not a private label merchant, the account identifier will cause the transaction to be processed using a bankcard network.

Pursuant to some embodiments, information associated with both types of transactions is provided to the cardholder in a single statement. Pursuant to some embodiments, private label transactions may include additional transaction detail (e.g., such as detailed information about each product purchased at a private label merchant). Pursuant to some embodiments, private label transactions are eligible for additional services provided by private label merchants (e.g., such as additional loyalty programs, promotional programs, etc.). In this manner, embodiments provide cardholders with the benefits of a private label card and the ease and convenience of a bankcard. A single account is opened for each cardholder, and a single card is used to access the account.

Pursuant to some embodiments, a dual card is issued to a consumer upon receipt of an application by the consumer or upon a customer "opting in" (or not "opting out") of an upgrade invitation/notification. For example, in some embodiments, customers apply for a dual card by making an application at a sponsoring merchant location. The issuance or approval process begins with the receipt of the application by the merchant. Based on the application, the issuing organization determines the interest rate and the credit line and may issue the dual card to the applicant. This is a combined private label and bankcard product with one interest rate and one credit line. The dual card includes features of both a private label card and a credit card, and may have one or more credit plans associated with it (e.g., a different interest rate may apply depending on whether the card is used for purchases at the homebrand, at bankcard merchants, for balance transfers, etc.). The dual card is associated with a single account and has a single credit line. The credit line may have a portion that is available only at the merchant's location. The issuer of the dual card will determine the size of the single credit line and the interest rate. Further details of the issuance (and later activation) will be provided below.

As a further example, certain private label cardholders may be selected to receive an invitation to/notification of upgrade from their existing private label card to a dual card. These cardholders may accept the invitation by opting in or remain eligible as a result of not opting out following notification. At the end of a predetermined period, these cardholders receive a personalized dual card that is ready for activation, and that may be used after activation.

In use, the cardholder may make a purchase with the dual credit card at either a private label merchant location or at a location accepting the bankcard. Either location may be an Internet site or a physical location. For the purposes of this application a location includes physical locations as well as Internet, mail order, telephone or other remote transactions. When a purchase is made at a sponsoring private label merchant location, the processing or routing of the purchase is done via a private-label processing channel. The private-label channel interchange fee (if any) is paid as part of this process. The private label back office operation processes the merchant location purchase as a private label purchase and then feeds the transaction to the dual card issuer or other processor (e.g., such as an issuer processor acting on behalf of the dual card issuer). Details of the transaction are then incorporated into the dual card balance and statement and settlement with the merchant occurs.

If the cardholder uses the dual credit card at a non-private label merchant location, the purchase is processed or routed through a bankcard network. Any associated network interchange fees are paid as part of this process. The cooperating back office operation processes the non-merchant purchase as a bankcard purchase. One feature of some embodiments is the use of a common back office facility for both bankcard purchases and private label purchases.

By using a common back office facility to process both private-label transactions and bankcard transactions for a dual card cardholder, cardholder statements may include merchant promotion material as well as normal operational customer service matters for both the merchant channel as well as the bankcard channel. The customer service functions may include normal customer service matters as well as collections and settlement issues. Other features will become apparent upon reading the following disclosure in conjunction with the attached figures.

System Overview

FIG. 1 is a block diagram overview of a payment card processing system 10 according to some embodiments of the present invention. In particular, system 10 is shown having an issuer 24 operating a private label processing platform 30 and a bank card processing platform 40 to process payment card transactions received over a private label network 20 and a bankcard network 22. These payment card transactions may originate from a number of locations, including for example from a homebrand retailer 14, a non-homebrand retailer 16, an automated teller machine (ATM) 18, etc. In particular, as shown, transactions at any of these locations using a dual card 12 may be processed using system 10. Although two separate processing platforms are shown, embodiments may also be implemented using a single processing platform, where private label and bank card account information is separated (e.g., in separate account databases).

As will be discussed further below, a transaction involving dual card 12 is routed either through private label network 20 or bankcard network 22 depending on whether or not the transaction involves a homebrand merchant (such as the homebrand mechant 14). In particular, a transaction involving dual card 12 and a merchant which sponsors the dual card 12 (the homebrand merchant) will be routed to issuer 24 via private label network 20. A transaction involving dual card 12 and a merchant other than the homebrand merchant will be routed to issuer 24 via bankcard network 22. Similarly, a transaction involving dual card 12 and an ATM will be routed to issuer 24 through the bankcard network 22.

Homebrand merchant 14 may also accept other bankcards for purchases. For example, point of sale terminals at the homebrand merchant 14 may conduct transactions involving at least three different types of payment cards: dual cards (as introduced herein); private label cards (usable only at the homebrand merchant); and normal bankcards. To illustrate a transaction involving a bankcard, a communication path is shown between homebrand merchant 14 and bankcard network 22 to indicate that, in many configurations, when a bankcard is presented for a purchase at a homebrand merchant, the bankcard transaction is routed through the bankcard network 22.

In one embodiment, private label network 20 is a public switched X.25 network that uses APACS 30-standard financial messages, and bankcard network 22 is the MasterCard network using ISO 8583 standard messages. Those skilled in the art will appreciate that other networks, network protocols, and message formats may also be used. For example, in some embodiments, both the private label network and the bankcard network may utilize ISO 8583 message formats.

Issuer 24, as shown, operates two processing platforms: a private label platform and a bankcard platform 40. For example, issuer 24 may issue both private label cards and bankcards. Account data associated with each type of payment card are stored at databases 36, 46. Those skilled in the art will appreciate that the account data may actually be stored in a single database or single data store where each type of account is separated by a logical partition or by separate account structures.

Private label processing platform 30 is coupled to receive transaction data from private label network 20. Authorization requests received via the private label network are authorized using a private label authorization module 32 and transactions are settled using a private label settlement module 34. A number of different processing platforms may be used as private label processing platform 30. For example, in one embodiment, private label processing platform 30 is based on the CARDPAC platform offered by PaySys International Inc.®. A routing module 25 is provided to determine whether transaction messages received via private label network 20 should be passed to private label processing platform 30 or to bankcard processing platform 40 for authorization. For example (as will be discussed further below), routing module 25 may route a dual card transaction to bankcard processing platform 40, and a private label transaction to private label processing platform 30.

Bankcard processing platform 40 is coupled to receive transaction data from bankcard network 22 (or from private label network 20 via routing module 25). Authorization requests received at the bankcard processing platform 40 are authorized using a bankcard authorization module 42 and transactions are settled using a bankcard settlement module 44. A number of different processing platforms may be used as bankcard processing platform 40. For example, in one embodiment, bankcard processing platform 40 is based on the VisionPLUS platform offered by PaySys International Inc. Those skilled in the art will appreciate that both the bankcard processing platform 40 and the private label processing platform 30 may interact with other entities to authorize and settle transactions. For example, stand in processing may be performed by an intermediary (e.g., such as a merchant acquirer or other processor) to provide stand in authorization processing.

In some embodiments, private label processing platform 30 and bankcard processing platform 40 may be the same platform (e.g., both platforms may be implemented using the VisionPLUS platform), but have separate account structures and datastores. Similar processing to upgrade and cross reference private label accounts and dual card accounts will be used as in embodiments in which the private label processing platform 30 and the bankcard processing platform 40 are separate or different.

Issuer 24 also operates (or interacts with) one or more support systems 50 to provide supporting functionality that may be used pursuant to some embodiments. For example, issuer 24 may operate (or interact with) an embossing or personalization function 52 to create embossed or personalized dual cards pursuant to the present invention. A customer service function 54 may also be provided to support dual card activation and customer services activities. Customer service function 54 may include the use of one or more front line associates ("FLAs") or customer service representatives as well as integrated voice response ("IVR") units to respond to customer activation requests as well as other customer inquiries. In some embodiments, customer service function 54 may also include a Web front-end allowing customers to interact with customer service function 54 over the Internet (e.g., to request individual account upgrades as discussed in conjunction with FIG. 2B below, to view statement or account information, etc.).

A risk and credit analysis function 56 is used to analyze potential new dual card accounts, establish pricing and establish credit lines. The issuer also maintains a general ledger 58. A statement generation function 60 is also operated by (or on behalf of) the issuer to generate account statements for dual card customers (including transactions made at both homebrand and non-homebrand locations).

Although only individual devices or entities are shown in FIG. 1, embodiments may include any number of these devices or entities. For example, a homebrand 14 may include a number of different point of sale devices, including retail point of sale terminals, Internet sales locations, mail order or telephone ("MOTO") locations, etc. Each of these locations may process transactions using dual cards by routing transaction information to the issuer 24 via a private label network 20. Further, there may be a number of different homebrand programs associated with different programs issued by issuer 24. For example, issuer 24 may issue dual cards in conjunction with several major retailers. Each of these retailers may operate (or be associated with) separate private label processing networks 20 that route transactions from their merchant locations to issuer 24. Further still, there may be a number of different issuers that issue dual cards pursuant to embodiments of the present invention.

Transaction Examples

Still referring to the payment processing system of FIG. 1, several transaction examples will now be provided to illustrate features of embodiments of the present invention. Each of these examples assumes that dual card 12 has been issued by issuer 24 (e.g., as described in conjunction with FIGS. 2-4), duly activated (e.g., as described in conjunction with FIG. 5), and is associated with a homebrand merchant 14.

As a first example, the cardholder presents dual card 12 to a sales representative at a homebrand retailer location to make a purchase. The sales representative may key the dual card account identifier into a card terminal or the dual card may be swiped or presented to a card reader to read the account identifier. The account identifier, along with other transaction information, is transmitted in a request message to request authorization of the purchase. The account identifier embossed or stored on dual card 12 identifies the dual card as a payment card that is routed via private label network 20. This identification may be made by a routing table stored in (or accessible to) the homebrand merchant's point of sale system or it may be made by a merchant acquirer (not shown) associated with the homebrand merchant.

The account identifier, along with transaction details, is routed to issuer 24 (or to a stand in processor) via private label network 20 for authorization. Private label processing platform 30 identifies the incoming authorization as an authorization associated with a dual card and routes the transaction to bankcard processing platform 40 for authorization (although, in some embodiments, private label processing platform 30 may be assigned stand in authorization responsibilities on behalf of the bankcard platform 40). Issuer 24 authorizes the transaction if the transaction complies with relevant authorization criteria. Settlement information may be captured along with the authorization or may be received in a batch file submitted by the merchant, causing the dual card account database 46 to be updated to reflect the purchase transaction. Dual card transactions which involve the homebrand retailer (and which are routed via the private label network 20 for authorization) may enjoy processing benefits generally unavailable to bankcards.

For example, homebrand transactions may include "enhanced data" associated with purchases made at the homebrand retailer. In one embodiment, this enhanced data is provided in an authorization or settlement message transmitted to the issuer 24, and may include detailed information about the merchant location, the product purchased, etc. This information is presented to the customer on his statement, allowing the customer to have a highly detailed and accurate listing of items purchased at homebrand retailers. As another example, homebrand transactions may enjoy promotional or loyalty benefits not typically available to purchases made with bankcards. These promotional or loyalty benefits may be based, at least in part, on the enhanced data associated with dual card purchases at homebrand retailers. Further, in some embodiments, private label network processing is subject to lower interchange fees than bankcard network transactions, providing homebrand retailers with less expensive transactions.

In some embodiments, promotion or loyalty benefits may be applied during settlement processing. Settlement processing, in some embodiments, may be performed as a batch process on a regular basis. For example, homebrand merchant 14 may send a daily settlement file to issuer 24 including transaction details associated with the day's transactions which were conducted with the issuer's PLCC cards and the issuer's dual cards.

As a second transaction example, the cardholder presents dual card 12 to a sales representative at a non-homebrand retailer location to make a purchase (or inserts the dual card into an ATM to retrieve cash). The account identifier identifies the card as a bankcard and also identifies the issuer so that an authorization request may be routed to the issuer 24 via the bankcard networks 22 for authorization. Issuer 24 authorizes the transaction if the transaction complies with relevant authorization criteria. Settlement information may be captured along with the authorization or may be received in a batch file submitted by the merchant, causing the dual card account database 46 to be updated to reflect the purchase transaction. In this manner, embodiments allow a single card, accessing a single account, to be used at different types of merchant locations and be processed using at two different types of networks (each of which provides different benefits to the customer and to the issuer). Other features and benefits will become apparent to those skilled in the art upon reading this disclosure. Further details will now be provided describing various approaches to the creation, activation, and management of dual card accounts.

Existing PLCC Account Upgrade

Pursuant to some embodiments, existing private label account holders may have their private label accounts upgraded to dual card accounts and be issued a dual card to replace their private label card. A number of different account upgrade processes may be utilized pursuant to embodiments of the present invention, including processes adapted to upgrade large numbers of existing cardholders (which will be discussed in conjunction with FIG. 2A) and processes to upgrade individual cardholders (which will be discussed in conjunction with FIG. 2B).

Figure 2A:
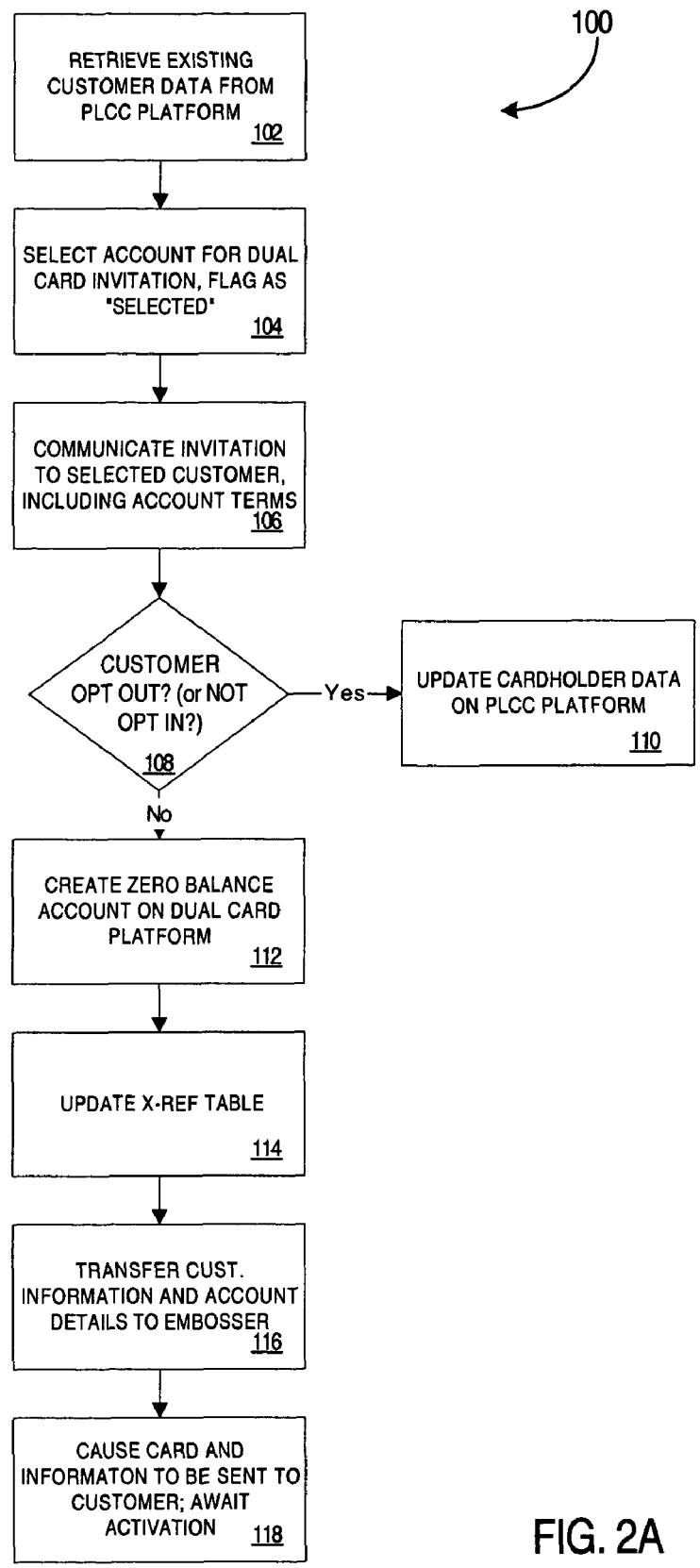
FIGS. 2A-2B are flow charts of methods for performing an account conversion pursuant to some embodiments of the present invention.

FIG. 2A is a flow chart of one embodiment of a method 100 for upgrading groups of existing private label cardholders into dual card cardholders. The flow charts described herein do not imply a fixed order to the steps, and embodiments of the present invention may be practiced in any order that is practicable. Method 100 may be performed by, or on behalf of, issuer 24. In some embodiments, an "opt out" system may be used (e.g., where an existing cardholder may be given the opportunity to opt out of a dual card opportunity). In some embodiments, an "opt in" system may be used, where an existing cardholder may be required to affirmatively opt in to take advantage of a dual card opportunity. Both embodiments will be described in conjunction with FIG. 2A. Further, those skilled in the art will appreciate that other combinations or types of offer programs may be used to solicit upgrades of existing cardholders.

Processing begins at 102 where existing customer data is retrieved from private label processing platform 30 (e.g., from private label account database 36 associated with private label processing platform 30). In some embodiments, only selected customer data is retrieved at 102 (e.g., such as customer data meeting a minimum risk threshold, etc.). Processing continues at 104 where the customer data retrieved at 102 is further processed to select existing customers to receive an invitation to upgrade/notification of upgrade of their existing private label account to a dual card account. In some embodiments, processing at 104 includes flagging each selected customer's account with an indicator designating the account as associated with a customer having been selected for an invitation/notification. In this manner, an issuer may ensure that a customer does not receive duplicate invitations/notifications. Processing at 104 may include further risk or credit scoring to identify suitable or desirable customers.

Processing continues at 106 where the invitation to/notification of upgrade to a dual card is communicated to each of the customers selected at 104. In some embodiments, processing at 106 includes generating an invitation/notification letter that includes detailed terms and conditions associated with the proposed dual card account. Further, information may be provided indicating whether the customer can opt out of the upgrade notified (or, in some embodiments, whether the customer needs to take steps to opt in to accept the invitation). In some embodiments, a time flag is associated with each selected account to identify when the opt out period (or the opt in period) expires for each selected account. In some embodiments (such as in an opt in approach), certain information (such as a notice of variation) may not be sent to individual customers (instead, the information may be provided after a customer has opted in or even in conjunction with an activation process).

The invitation/notification communicated at 106 also includes a detailed listing and explanation of the terms of the proposed dual card account. For example, the terms may include a proposed credit limit, interest rate, and other terms associated with the dual card account. Further, pursuant to some embodiments, an additional "retailer reserve" associated with the homebrand merchant may also be established and communicated to the customer at 106. For example, a homebrand merchant (and/or the issuer 24) may determine that some additional amount of credit limit may be offered to customers for purchases made at the homebrand merchant.

As a specific example offered to illustrate operation of a "retailer reserve" in conjunction with an issued dual card, a customer may be issued a dual card having a credit limit of $1,000. The homebrand merchant (and/or the issuer 24) may determine that the customer is also eligible for a 10% retailer reserve. This retailer reserve allows the customer to make an additional $100 of purchases at the homebrand, even though the outstanding balance on the dual card has reached its $1,000 credit limit. In some embodiments, the customer is reminded (or informed) of this retailer reserve amount when the customer's account balance nears the credit limit (e.g., the customer may be notified of the additional retailer reserve amount in the customer's monthly statement in a month in which the account balance is nearing the credit limit).

Processing continues at 108 where a determination is made whether the customer has opted out or declined the upgrade to a dual card account (or, in some embodiments, where a determination is made whether the customer has failed to opt in to accept the invitation). For example, a customer may opt out by contacting a customer service system within a designated period of time. If a customer has declined the upgrade, processing continues at 110 where the private label account database 36 is updated to indicate that the customer associated with the account has been notified of upgrade but has opted-out. As another example, if an opt in system is used, if the customer has not opted in before the expiration of the opt in period, processing will continue at 110 where the private label account database 36 is updated to indicate that the customer has not opted in. In some embodiments, customers are not provided the opportunity to either opt in or opt out, and each of a selected group of private label accounts may be upgraded using features of the process of FIG. 2A.

If, on the other hand, processing at 108 determines that the customer has accepted the invitation (or, has failed to opt out within the opt out period), processing continues at 112 where a zero balance account is created on the dual card processing platform 40 (e.g., by assigning a new dual card account identifier to a new account record in dual card account database 46). Customer information and other non-monetary details associated with the customer's private label account may also be associated with the new account record in the dual card account database 46. For example, sufficient information may be associated with the new account record to allow an inactive dual card to be personalized for the customer. In some embodiments, prior to the creation of the zero balance dual card account, processing at 112 may include performing a risk reevaluation of the customer to ensure that there have not been any events that would disqualify the customer from upgrading to a dual card account. For example, this may include performing an additional risk or credit analysis to determine if the customer has experienced any defaults or other major credit events. If the risk reevaluation identifies that the customer is no longer eligible for the upgrade, a FLA may communicate this to the customer, and processing may terminate at 110. This risk reevaluation may be performed at a number of different times after the selection of an account for upgrade to ensure that an upgrade is not performed for a customer who is not eligible for the upgrade. For example, in some embodiments, a customer's credit risk is continually evaluated until the customer's account is ultimately activated (or declined).

Processing continues at 114 where a cross-reference table is updated to cross-reference the cardholder's private label account identifier with the new dual card account identifier assigned at 112. As will be discussed further below, this cross-reference table may be used to manage and identify any monetary and non-monetary trailing activity associated with the private label account.

Processing continues at 116 where customer information and account information (including the dual card account identifier) are transferred to an embosser (such as the embossing function 52 shown in FIG. 1) to create the dual card. In some embodiments, the dual card is a magnetic stripe card and processing at 116 involves creating an embossing record. In some embodiments, the dual card is a smart card having a memory and processing at 116 involves creating a personalization record for personalizing the memory of the smart card (those skilled in the art will appreciate that the smart card personalization record may also include information used to emboss the smart card as well). Information may be transferred to the embosser (or personalizer) in any of a number of different ways common in the art (e.g., by file transfer protocol, via a diskette or other storage device, etc.).

The embosser (or personalizer) utilizes the information transferred at 116 to create a dual card personalized for the customer. Processing continues at 118 where the embossed (or personalized) dual card is sent to the cardholder along with information on how to activate the account for use. An activation process pursuant to some embodiments will be discussed further below in conjunction with FIG. 5. In some embodiments, during the time period after creation of the cross-reference table at 114 and before activation of the dual card, the private label account on the private label processing platform 38 is monitored to detect any non-monetary data changes. For example, if the customer submits a change of address form that causes non-monetary data to change on the private label processing platform 38, this information will be propagated to the dual card processing platform 40 to ensure that non-monetary data associated with the zero balance account on the dual card platform is up to date.

In this manner, embodiments provide an efficient approach to upgrade private label accounts (hosted on one platform) to dual card accounts (hosted on a second platform) having additional features and benefits. Processing associated with FIG. 2A may be performed on a batch basis to upgrade batches or groups of accounts. In some embodiments, processing associated with FIG. 2A may be structured to ensure that system processing impacts are eased. For example, invitations sent at 106 may be sent out in groups having similar opt out (or opt in) periods to ensure that processing demands are spread over the course of a period of time.

Figure 2B:
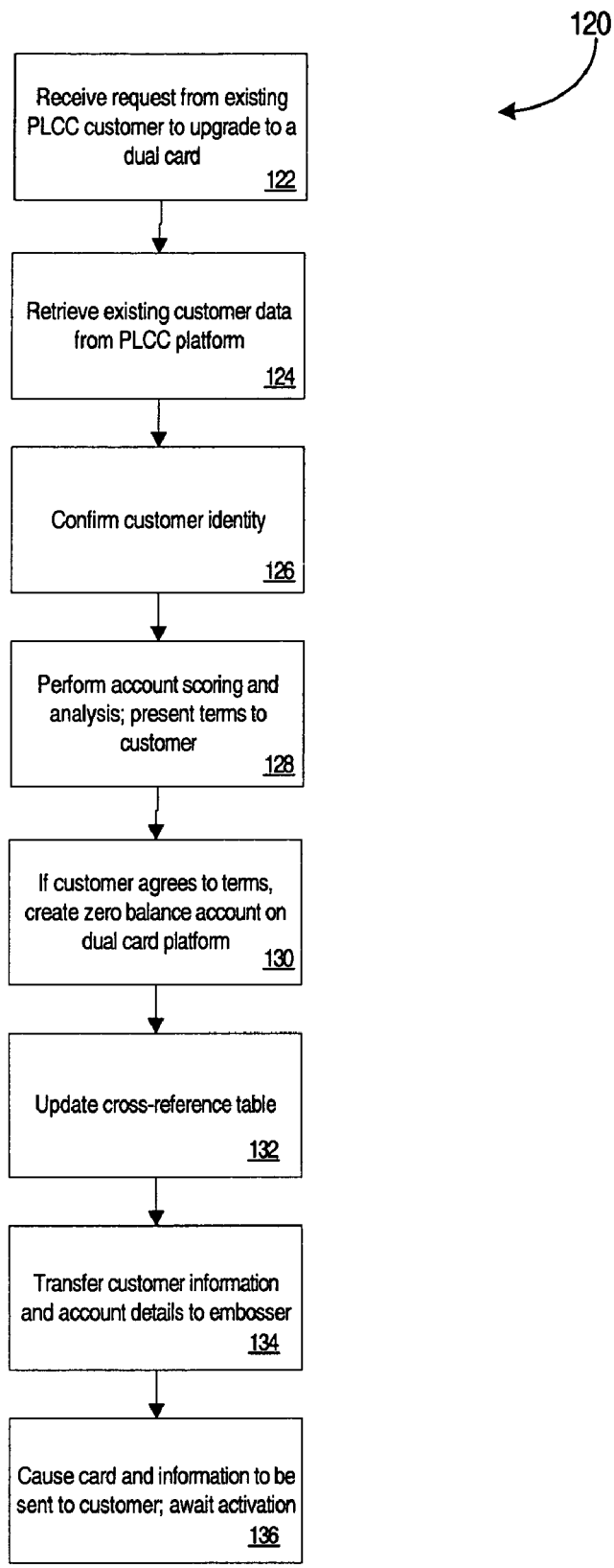

FIG. 2B is a flow chart of a method 120 for upgrading individual accounts at the request of existing private label cardholders. Method 120 may be performed by, or on behalf of, issuer 24. Method 120 may be initiated by an existing customer who wishes to upgrade her private label account to a dual card account. Unlike the method of FIG. 2A (which generally is adapted to perform upgrades for a number of accounts at the same time), the method of FIG. 2B may involve upgrades of individual accounts based on customer-initiated requests for upgrade.

Processing begins at 122 where issuer 24 (or an agent of issuer 24) receives a request from an existing PLCC customer to upgrade a PLCC account to a dual card account. This request may be received in a number of different ways. For example, in some embodiments, the request is received by a customer service Web site operated on behalf of issuer 24 (e.g., associated with customer service function 54 of FIG. 1). In some embodiments, the request is received by a FLA over a telephone or in person (e.g., staffing a kiosk at a homebrand merchant location). In some embodiments, the request is received by an interactive voice response (IVR) unit. Preferably, the request is received by an operator or device coupled to receive and interact with account information from issuer 24. In some embodiments, the customer is required to provide account and other verifying information.

Processing continues at 124 where the account and other verifying information is used to retrieve the customer's existing customer data from the PLCC platform. For example, current balance information, credit history information, and other information may be retrieved. Processing continues at 126 where the customer's identity is confirmed (e.g., by requesting personal identifying information, a personal identification number, etc.). In some embodiments, processing at 126 may include determining whether the customer has previously been offered a dual card upgrade (and, if so, whether the current upgrade request should be terminated or allowed to proceed).

Processing continues at 128 where the issuer 24 (or an agent of the issuer) performs account scoring and other analyses to determine if the customer is eligible to upgrade to a dual card account, and, if so, the terms of the upgraded account. The terms are presented to the customer for approval. In some embodiments, a listing of different products may be presented for which the customer is eligible (e.g., if the customer is eligible for different levels of upgraded accounts, information about each of the different levels may be presented to the customer for their consideration).

If the customer agrees to the terms of the upgraded account, processing continues at 130, a zero balance account is created on the dual card processing platform, and processing similar to the processing of FIG. 2A (processes 112-118) are performed to complete the issuance of a dual card account. For example, processing may continue at 132 where a cross-reference table is updated, associating the customer's PLCC account information with the dual card account established at 130. Account and customer information is transferred to the embosser or personalizer to create the card and the card is sent to the customer for subsequent activation. In this manner, embodiments allow individual customers to take affirmative actions to upgrade their accounts from PLCC accounts to dual card accounts, thereby enjoying the added benefits and features of the dual card account.

Figure 3:
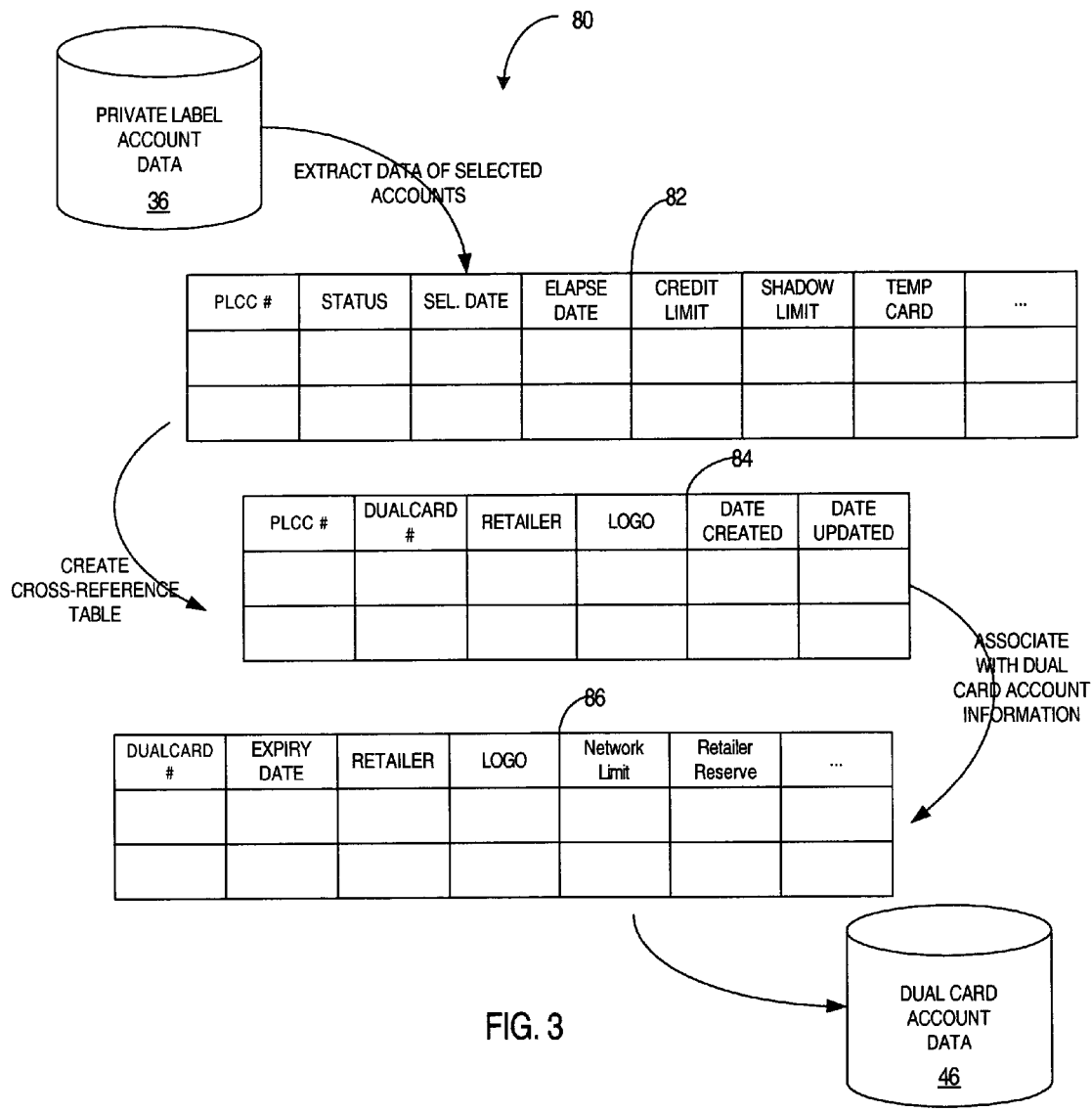
FIG. 3 is a diagram illustrating data structures used tin conjunction with the account conversion methods of FIG. 2.

Reference is now made to FIG. 3, where a block diagram 80 depicts features of the conversion processes of FIGS. 2A and 2B. As shown in FIG. 3, data is extracted from private label account database 36. This selected account information is used to create a table 82 of selected private label account data and to manage the conversion process. The table may include, for example, fields identifying the selected private label account identifiers, a status (e.g., such as "selected", "opted in", "accepted", etc.), a selection date, an elapse date (when the opt out, or opt in periods expire), a credit limit to be offered, etc.

If a customer accepts an invitation to/does not opt-out of a notified upgrade a private label account to a dual card account (e.g., when the status indicates "accepted" or "opted in"), a dual card account is created and a cross-reference record (such as the records illustrated by table 84) is created associating the new dual card account identifier with the old private label account identifier along with other information. This cross-reference record is used to ensure that any trailing activity associated with the private label account is properly associated in the dual card account.

The cross-reference record associates the private label account identifier with the dual card account identifier stored in the dual card account database 46 associated with the dual card processing platform 30 at issuer 24. Table 86 represents sample dual card account database records.

Similar tables may be created and used to assist in upgrades as described with reference to FIG. 2A. For example, when a current private label customer initiates a process to upgrade her account to a dual card account, the private label account data is extracted into a table such as table 82 and is referenced in a cross reference table 84 which associates the private label information with the newly created dual card account information. As will be described further below, the use of this cross-reference table allows embodiments to track and identify trailing activities associated with the private label account and appropriately update dual card account information to reflect the trailing activity.

In some embodiments, the process of FIG. 2B may be initiated by a customer desiring an upgrade and may cause information to be used in a process similar to the process of FIG. 2A. For example, customer requests for upgrades may be processed and risk evaluated, and then added to the opt-in batch processing associated with FIG. 2A.

New Account Application

Pursuant to some embodiments, dual card accounts may be issued as both upgraded accounts (as described above in conjunction with FIGS. 2 and 3, for example) as well as new accounts. New dual card accounts may be issued based on "in-store" applications received from new customers as well as other applications received from customers. A new account application process will now be described by reference to FIG. 4, where an "in-store" application process is described. Those skilled in the art will recognize, upon reading this disclosure, that similar techniques may be used to issue dual card accounts based on other types of new customer applications.

Figure 4:
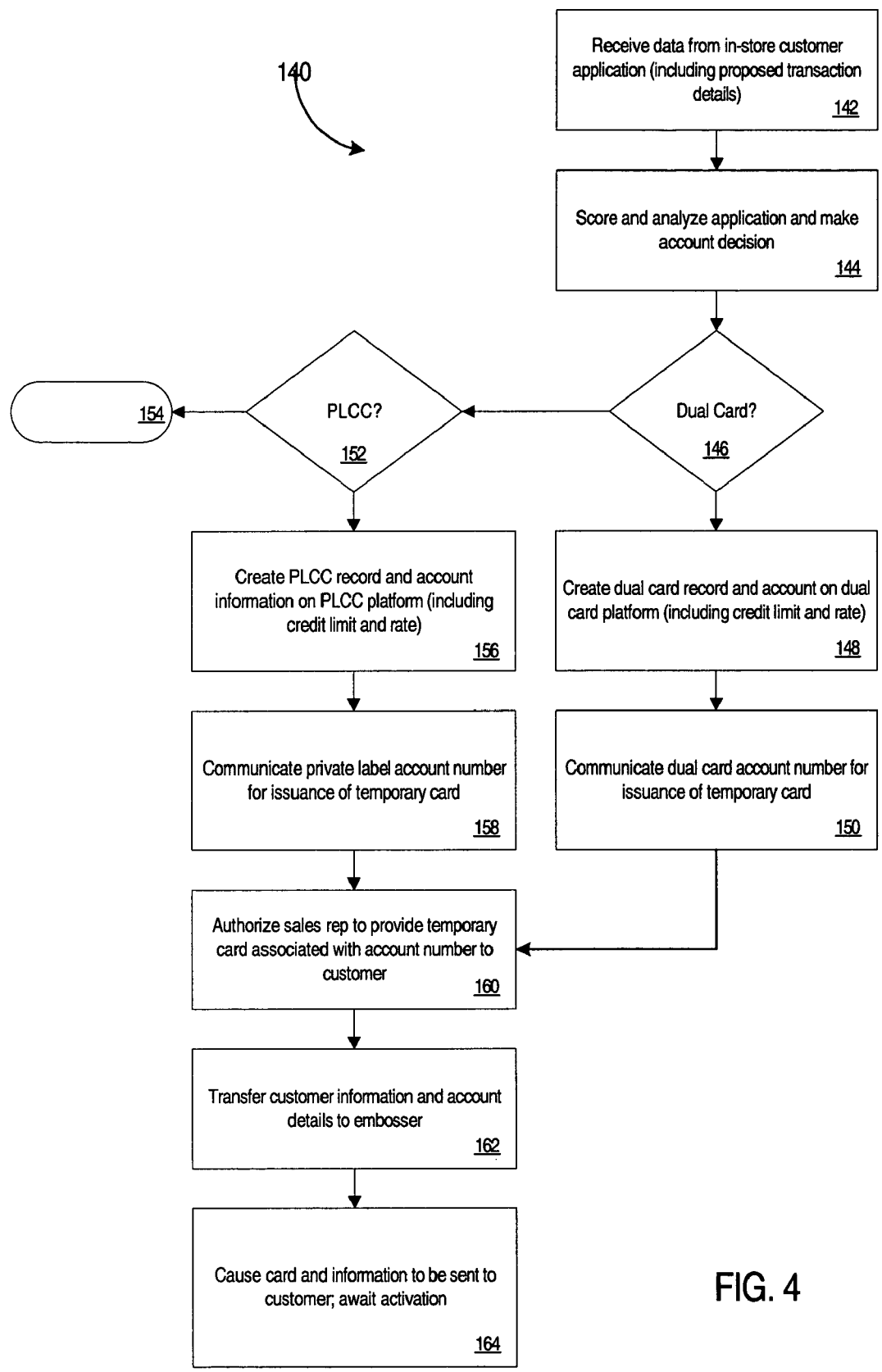
FIG. 4 is a flow chart of a method for performing a new account application process pursuant to some embodiments of the present invention.

FIG. 4 is a flow chart of a method 140 for performing a new account application process pursuant to some embodiments. Method 140 may be performed by, or on behalf of, issuer 24. Method 140 begins at 142 where the issuer (or an agent of the issuer) receives data from an in-store customer application (including information identifying a proposed transaction). For example, pursuant to some embodiments, customers shopping at homebrand merchant locations may be solicited to apply and receive either a private label card or a dual card. Customers may be offered an incentive to apply for a new account (e.g., such as 10% off the total amount of their purchases made at the homebrand retailer at the time of the application). In some embodiments, the dual card application is performed at the homebrand merchant's point of sale register. For example, when the customer approaches the point of sale to purchase items, the customer is asked to complete an application form for either a private label card or a dual card. In some embodiments, the application form is designed to capture sufficient information to make a credit decision for issuance of either a private label card or a bankcard. In some embodiments, the application form allows the customer to opt-out of either the private label or the dual card products (that is, the customer may specify which card product he wishes to apply for).

Processing at 142 may include scanning or entering application information from the application form so that it may be communicated to the issuer 24 (or to an agent of the issuer responsible for performing new account scoring or decisioning). Processing continues at 144 where the issuer 24 (or an agent of the issuer) scores and analyzes the application and makes an account decision. Processing at 144 may involve, for example, referencing or communicating with third party resources (e.g., such as the account scoring resources of Experian Corp., or the like; similar scoring resources may be used in conjunction with other credit rating and evaluation processes described elsewhere herein). Processing at 144 may also include performing duplicate checks to ensure that the customer has not previously been issued a PLCC or dual card by the issuer 24. The account decision may be to issue the customer a dual card account, to issue the customer a private label account, or to decline the customer for any account.

If the customer is not approved for a dual card account (e.g., if the customer's credit score is lower than a threshold established for the issuance of dual card accounts), the customer may be approved for a private label account at 152 (if the customer has not opted out of the private label product). Processing continues at 156 where a PLCC record and account information are created on the PLCC platform, including terms of the PLCC account (e.g., such as the credit limit and interest rate associated with the account). Processing continues at 158 where a temporary account number is communicated to the sales representative. This temporary account number may be the same as the account number of the PLCC account established on the PLCC platform at 156. In some embodiments, this temporary account number is only useable for purchases made at the homebrand merchant and may be subjected to additional authorization controls (e.g., such as special floor limits, etc.).

If the customer was approved for a dual card account, processing proceeds from 146 to 148 where issuer 24 (or an agent of issuer) determines terms associated with the dual card account to be issued to the customer, including a dual card credit limit, a retailer reserve amount, and an interest rate. Other terms may also be determined at 148. Processing at 148 includes creating a dual card account record and account information on the dual card platform. Processing continues at 150 where, in some embodiments, the dual card account number established at 148 is used to issue a temporary card. The account number may be provided to the sales representative at 160 so that the sales representative can provide a temporary card associated with the account number to the customer. In some embodiments, this temporary account number is only usable for purchases made at the homebrand merchant and may be subject to additional authorization controls (e.g., such as special floor limits, etc.).

In this manner, the customer may be allowed to make purchases at homebrand merchant locations during the period between when the new account is approved and when the customer actually receives his embossed card for activation. In some embodiments, the temporary card provided to the customer at 160 is activated with a limited duration (e.g., an expiration date of several days or weeks may be provided). Further, in some embodiments, temporary cards may be identified as such by their account identifiers, allowing transactions involving the temporary cards to be processed with additional authorization controls (such as reduced credit limits or special floor limits). Pursuant to some embodiments, a homebrand merchant may elect to not issue temporary cards and processing at 160 is not performed.

Processing continues at 162 where the customer information associated with either the new PLCC account (established at 156) or the new dual card account (established at 150) are transferred to an embosser or personalizer to create a personalized card. The card and associated account information is sent to the customer at 164 to await activation.

Card Activation

Pursuant to some embodiments, dual cards issued as a result of upgrades or new applications (such as described above in conjunction with FIGS. 2-4) are not usable until they are activated by the customer associated with the card. In some embodiments, when a new card is sent to a customer, information is provided instructing the customer to contact a customer service function (such as the customer service function 54 associated with issuer 24). Referring now to FIGS. 5A-5D, flow charts are shown which represent activation processes pursuant to some embodiments of the present invention.

Figure 5A:
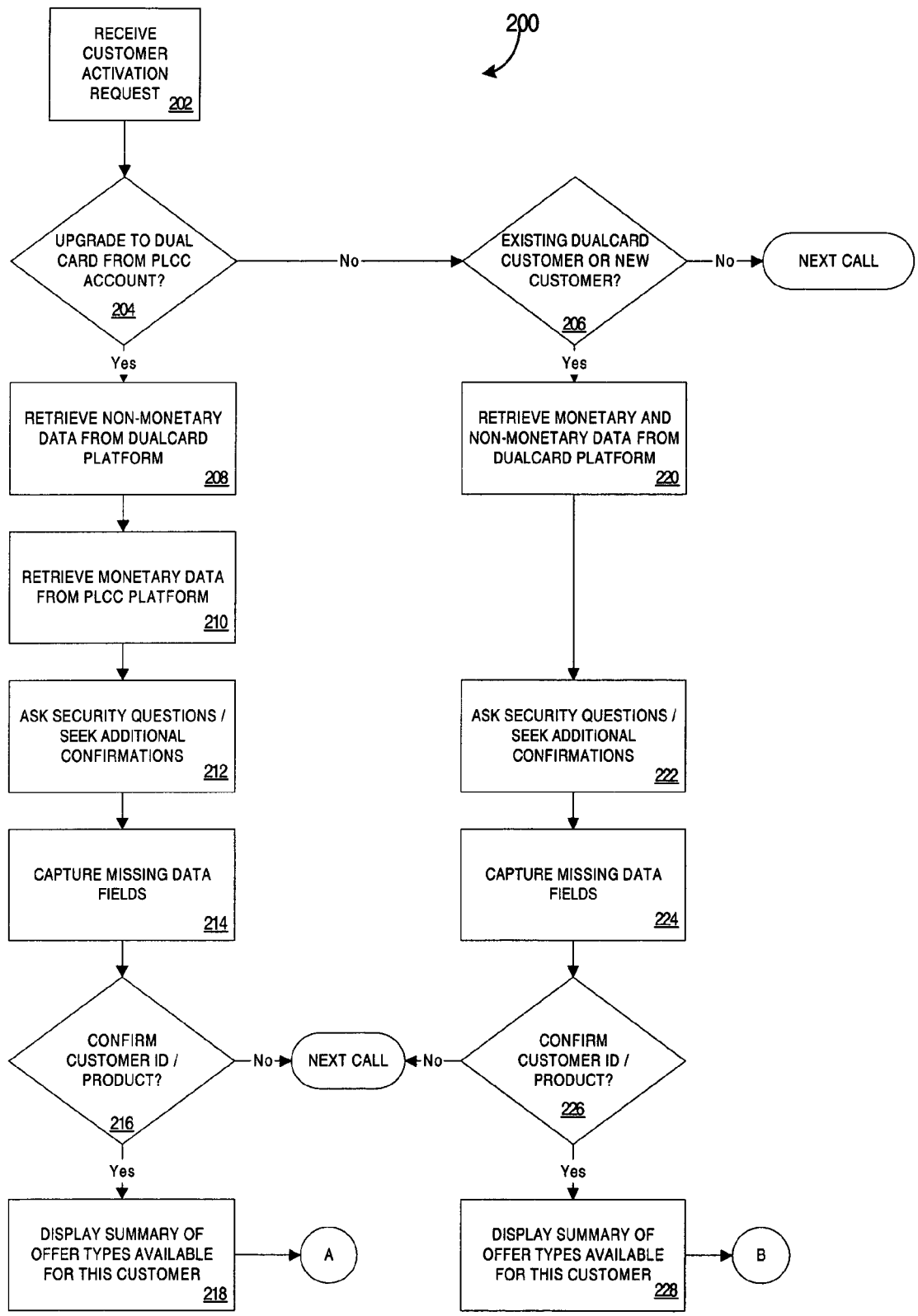
FIGS. 5A-5D are flow charts of methods for activating dual cards issued pursuant to embodiments of the present invention.
Figure 5B:
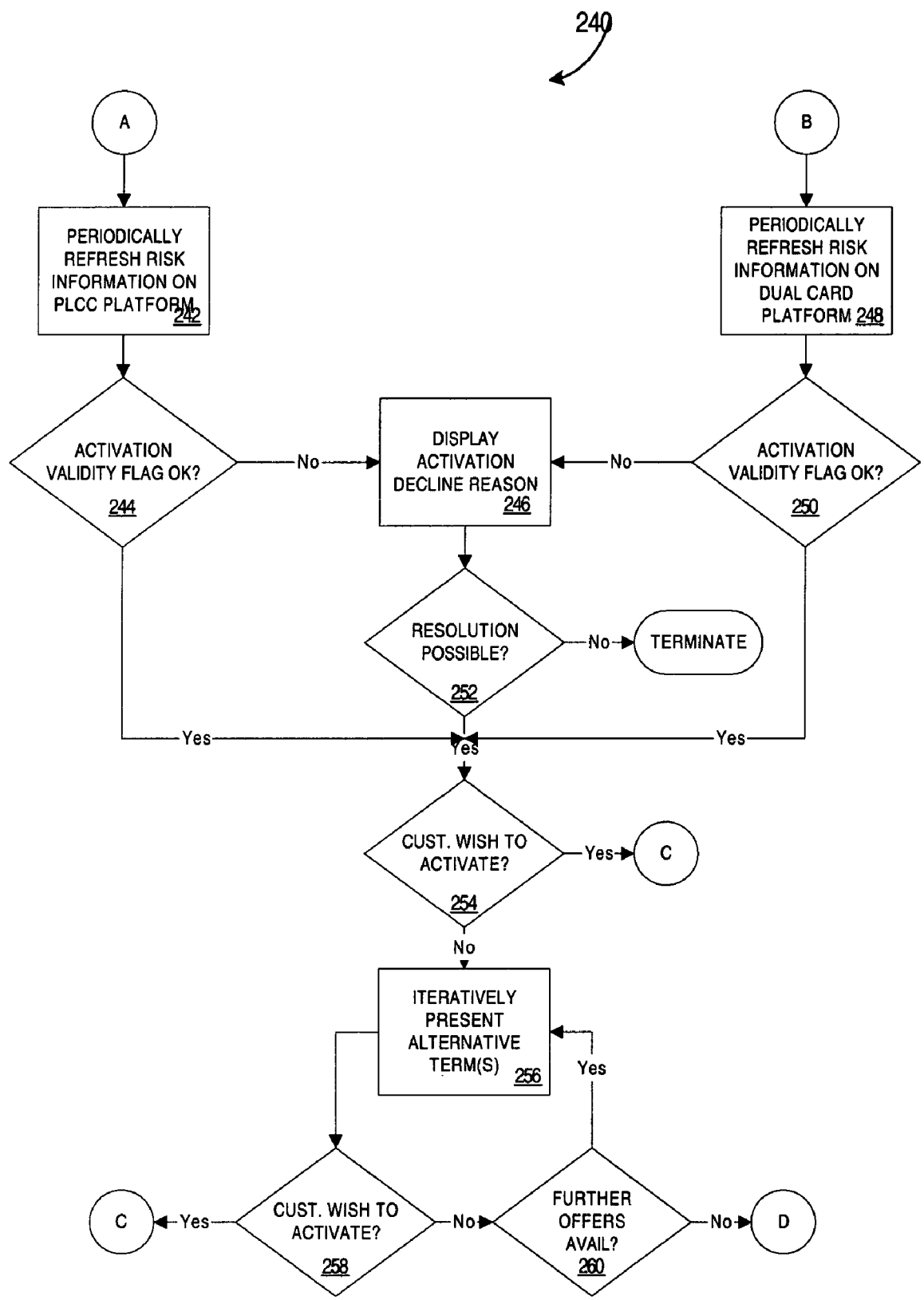
Figure 5C:
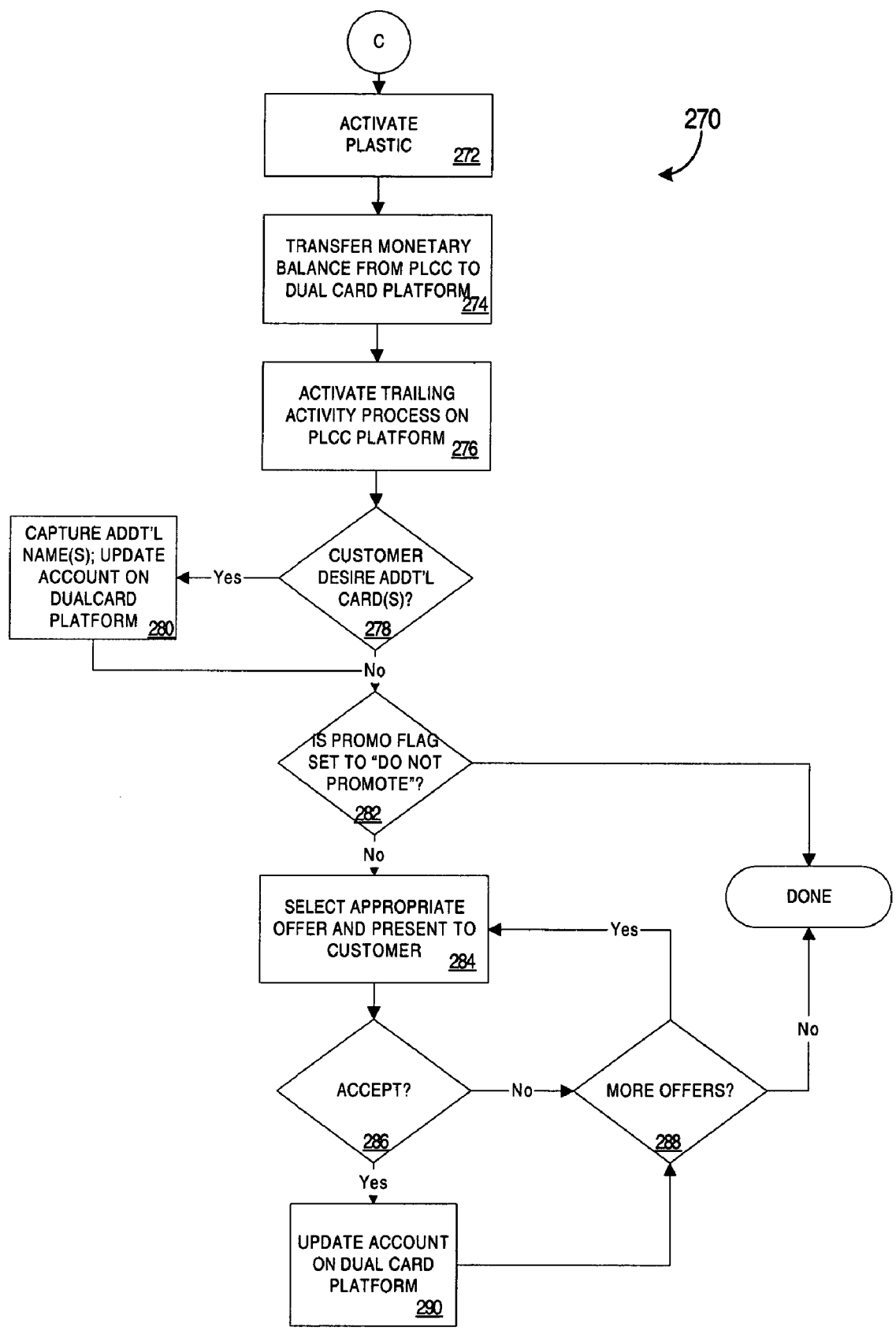

Referring first to FIG. 5A, a process 200 is shown. Process 200 begins at 202 where a dual card activation request is received from a customer. For example, this activation request may be received by a customer service representative or FLA associated with a customer service function 54 of issuer 24. For example, the customer may follow activation instructions provided with the dual card mailed to the customer (which may, for example, instruct the customer to telephone a customer service telephone number to interact with an IVR or to speak with a FLA). The customer may provide information identifying the particular dual card to be activated (such as the account identifier embossed on the card, etc.).

Processing at 204 includes determining whether the request is for an activation of a dual card which is an upgrade from a PLCC (e.g., as described in conjunction with FIG. 2 above), whether the request is for an activation of a new dual card (e.g., issued as described in conjunction with FIG. 4, above) or whether the request is for modification of an existing dual card account. If the former, processing continues at 208 where non-monetary data (e.g., such as account information and the customer information provided to the embosser) is retrieved from the dual card platform. This non-monetary information may be displayed to the FLA so that the FLA may orally confirm the accuracy of the information with the customer.

Processing continues at 210 where monetary data is retrieved from the PLCC platform (e.g., by identifying the PLCC account identifier through the cross reference table created during the issuance process). For example, the account balance, payment history, and other information associated with the private label account are retrieved and displayed to the FLA. Processing continues at 212 where the FLA may ask the customer security questions and/or seek additional confirmations of the customer's identity and the accuracy of the information. Any missing non-monetary data may be identified and entered by the FLA. The missing data may be used to update the issuer's records.

Processing continues at 216 where the FLA confirms the customer's identity and the product to be activated. If the customer or the product cannot be accurately identified, processing may terminate and the FLA may move to the next call or customer in the queue. In some embodiments, the customer may be referred to another FLA for further processing to attempt to remedy the situation.

If the customer and product are verified, processing continues at 218 where information is displayed to the FLA providing a summary of offer types available for the customer. For example, pursuant to some embodiments, a number of offer rules may be specified by issuer 24 (and/or the homebrand merchant 14). These offer rules may specify eligibility requirements to receive each offer. Processing at 218 includes comparing these eligibility requirements to information about the customer (such as the non-monetary and monetary data retrieved at 208 and 210) to identify which (if any) offers the customer is eligible for. A number of different types of offers may be available, including loyalty offers, promotional discounts, etc.

Processing continues at 242 (shown at FIG. 5B) where risk information is refreshed based on monetary data associated with the customer on the PLCC platform. For example, credit and risk processes may be executed to determine whether the customer's risk or credit profile has changed. A determination may be made at 244 whether the customer remains eligible for the dual card account. If the customer is not eligible (e.g., a credit event has occurred since the time of the issuance of the card that has rendered the customer ineligible for the upgrade), processing continues at 246 where information is displayed to the FLA regarding the activation decline reason. The FLA, or a customer service manager or other agent, may determine if any resolution is possible at 252 (for example, if the customer has a past due amount associated with the private label account, arrangements may be made to pay the past due amount and allow the customer to remain qualified for the dual card upgrade). If resolution is possible, processing continues to 252. If resolution is not possible, processing terminates. In some embodiments, the customer's private label account information is flagged to indicate that the customer was declined for the upgrade and the zero balance account on the dual card platform is blocked or deleted to prevent use and to free up the account identifier for future use.

If the customer remains eligible for the upgrade, processing continues at 254 where the FLA confirms with the customer that the customer still wishes to activate the dual card account upgrade. If, for some reason, the customer declines or objects to one or more terms of the dual card account, processing may continue to 256 where one or more rebuttal or alternative terms may be presented to the customer. For example, in some embodiments, a sequence of rebuttal presentations may be made, depending on information associated with the customer. A customer having a very high credit rating may, for example, be offered a lower interest rate or a higher credit limit. Each of these rebuttal terms may be offered to the customer in a predefined sequence until the customer either confirms the dual card upgrade or finally declines the upgrade. If the customer declines the upgrade, processing continues at 302 (discussed below in conjunction with FIG. 5D). If the customer confirms the upgrade with the varied or alternate term(s), processing continues at 272 (shown at the top of FIG. 5C).

Processing continues at 272 where the dual card is activated. This activation may include setting a flag associated with the dual card account record to indicate that the account has been activated. Processing continues at 274 where the monetary balance associated with the private label account on the private label processing platform is transferred to the dual card platform. For example, because the upgrade may have involved an upgrade from a PLCC account which was actively used by the customer (and which includes a current balance and current transactions), processing at 274 may include posting the following items to the dual card account: the current balance; any accrued interest; all current period transactions including transaction details. At substantially the same time, a contra posting is made to the PLCC account to zero out the items on the PLCC account. In general, the posting to the PLCC account should net the PLCC account balance to zero as of the time that processing at 274 is performed. Processing at 274 may also include blocking the PLCC account to prevent further use of the PLCC account.

In some embodiments, some trailing activity (both monetary and non-monetary) may occur after the date of the posting at 274. Processing at 276 includes activating a trailing activity process on the PLCC platform to ensure that any activity associated with the upgraded PLCC account is reflected on the dual card account. This trailing activity process may be performed on a regular basis (e.g., such as on a nightly batch process) to quickly identify any trailing activity. The cross-reference table generated during the new account upgrade process of FIG. 2 may be used to manage this trailing activity process and to help ensure that transactions involving an upgraded PLCC account are properly reflected on the dual card account. This trailing activity process may be performed on a regular (or constant) basis until all trailing activities have been identified.

Processing continues at 278 where the FLA queries whether the customer wishes to receive additional cards associated with the upgraded account. If so, processing continues at 280 where additional cardholder information is captured and the information is used to update the dual card account on the dual card platform. Processing at 280 can also include transferring information to an embosser or personalizer to cause the additional cards to be created and transmitted to the customer.

Processing continues at 282 where a determination is made whether the customer can receive promotional offers or not. For example, in some embodiments, customers may indicate to issuer 24 that they do not wish to receive any promotional offers or solicitations. Such an indication can be reflected in the dual card account database using a flag indicating that the customer is not to be promoted or "do not promote". If the flag indicates "do not promote" processing is complete and the dual card is ready for use by the customer.

If the promotion flag is not set to "do not promote", processing may continue at 284 where one or more promotional offers are presented to the customer. Processing at 284 may include determining whether any offers are available for presentation to the customer. A wide variety of types of offers may be made, including, for example: balance transfers; preferential interest rates; credit limit changes; insurance; in-store promotions; loyalty programs and other benefits; etc. If the customer accepts an offer, processing may continue at 290 where the customer's account on the dual card platform is updated to reflect the terms of the offer (e.g., if the customer accepts an incentive promotion which will provide him with a six month interest-free period for all purchases made at the homebrand merchant on September 15, the terms of the offer will be reflected in the account so that the incentive can be appropriately credited to the customer's account balance). Additional offers may be selected and presented until there are no more offers available for the customer or until the customer indicates a desire to terminate the offer process. At this point, the dual card is activated and available for use by the customer.

Similar processing can be performed to activate dual cards issued to new customers or dual cards issued to existing dual card customers, with the exception that no processing is needed to transfer a monetary balance or non-monetary information from the PLCC processing platform to the dual card platform.

Figure 5D:
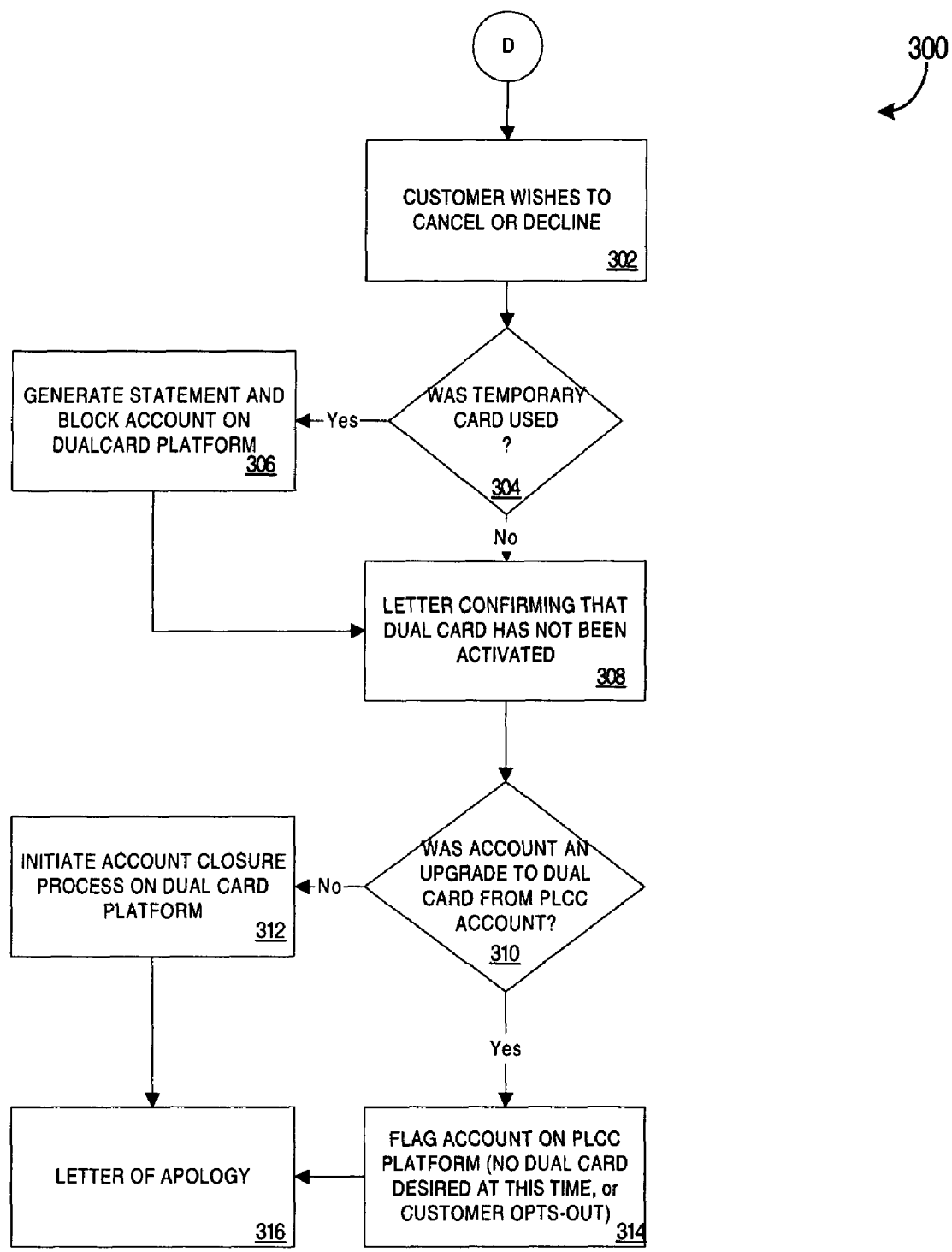

If, during the activation process, a customer indicates a desire to cancel or decline activation of the dual card, processing continues at 302 (see FIG. 5D). After receipt of the customer's indication of a desire to cancel or decline activation, processing continues at 304 where a determination is made whether the customer used or was provided with a temporary shopping card. If so, processing continues at 306 where the issuer generates a statement and blocks the account on the dual card platform from any further use. Any amounts charged to the temporary shopping card will be invoiced to the customer and the balance on the temporary shopping card will be settled. Processing continues at 308 where a letter or other correspondence is generated and transmitted to the customer confirming that the dual card has not been activated.

Processing continues at 310 where a determination is made whether or not the account was an upgrade to a dual card account from an existing PLCC account. If the account was not an upgrade (e.g., if the dual card account was set up in response to an in-store application for a new account) processing continues at 312 where the zero balance account established on the dual card platform is cancelled and blocked so that it will not be inadvertently used.

If processing at 310 indicates that the account was an upgrade from an existing PLCC account, processing continues at 314 where the PLCC account on the PLCC platform is flagged to indicate that the customer does not desire a dual card at this time or that the customer has opted-out from receiving a dual card upgrade. The zero balance account established on the dual card platform may also be cancelled and blocked so that it will not be inadvertently used. Processing at 314 may also include removing the dual card account identifier from the cross-reference table associating the account identifier with the PLCC account.

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Some embodiments have been described herein with respect to an embodiment in which a new payment card product is provided and which is supported by an issuer operating different settlement platforms. In some embodiments, an issuer may operate a single settlement platform for both dual card and private label products. In some embodiments, multiple issuers may cooperatively interact to provide processing as described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:
   selecting a private label account maintained on a first processing platform for upgrade to a dual card account, said private label account associated with an account holder and having associated monetary and non-monetary data;
   determining that the account holder agrees to terms associated with the dual card account;
   creating said dual card account with a dual account identifier and a zero balance on a second processing platform that is separate and distinct from said first processing platform in response to the determining that the account holder agrees to the terms;
   extracting the associated monetary and non-monetary data from a private label database associated with said private label account and said first processing platform;
   transferring said non-monetary data associated with said private label account from said first processing platform to said second processing platform for association with said dual card account;
   causing a dual card associated with said dual card account to be transmitted to said account holder, said dual card and said dual card account being inactive until activated;
   transferring said monetary data associated with said private label account from said first processing platform to said second processing platform for association with said dual card account in response to an activation of said dual card and said dual card account;
   blocking said private label account from further use; and
   initiating a trailing activity process to identify monetary and non-monetary activity associated with said private label account, wherein said initiating of said trailing activity process includes updating a cross reference table associating said private label account with said dual card account to include the monetary and non-monetary activity identified by trailing activity process.

2. The method of claim 1, wherein said selecting a private label account for upgrade further comprises:
   receiving a conversion request from said cardholder, said request received by at least one of: a front line associate; an interactive voice response unit; and a Web site.

3. The method of claim 1, wherein said selecting a private label account for upgrade includes selecting a plurality of private label accounts for upgrade, the method further comprising:
   creating a plurality of dual card accounts with a dual card account identifier and a zero balance on said second processing platform;
   transferring said non-monetary data associated with said plurality of private label accounts to said second processing platform for association with said plurality of dual card accounts; and
   causing a plurality of dual cards associated with said plurality of dual card accounts to be transmitted to said account holders, said plurality of dual cards and dual card accounts being inactive until activated.

4. The method of claim 1, further comprising:
   communicating, to said plurality of cardholders, an opportunity to upgrade said private label account to said dual card account.

5. The method of claim 1, further comprising:
   receiving an activation request from said account holder;
   confirming that said account holder remains eligible for said dual card account; and
   activating said dual card account.

6. The method of claim 5, further comprising:
   retrieving said non-monetary data from said second processing platform; and
   confirming with said account holder that said non-monetary data is accurate.

7. The method of claim 1, wherein said non-monetary data includes data identifying said cardholder.

8. The method of claim 1, wherein said selecting further comprises:
   updating a status flag associated with said private label account to indicate that said account has been selected for said conversion to said dual card account.

9. The method of claim 4, further comprising:
determining that said account holder has not declined said opportunity by determining that a time period for declining said opportunity has expired.

10. The method of claim 1, wherein said private label account is identified by a private label account identifier and said dual card account is identified by said dual card account identifier, the method further comprising:
generating a table including a cross-reference between said private label account identifier and said dual card account identifier.

11. The method of claim 1, wherein said private label account is associated with a private label merchant, the method further comprising:
generating account information associated with said dual card account, said account information including an overall credit limit and a retailer reserve presented to said account holder, said retailer reserve usable for purchases at said private label merchant.

12. The method of claim 11, wherein said generating account information further comprises generating a rate associated with said dual card account.

13. The method of claim 1, further comprising:
creating said dual card.

14. The method of claim 13, wherein said creating said dual card includes at least one of: (1) embossing a magnetic stripe card with said account holder information and a dual card account identifier; and (2) storing information identifying said account holder and said dual card account identifier in a memory of a smart card.

15. The method of claim 1, wherein said dual card account identifier is routable over both a private label network and a bankcard network.

16. The method of claim 1, further comprising:
updating a cross-reference database table with said extracted associated monetary and non-monetary data, wherein said cross-reference database table is associated with both said private label account and said dual card account.

17. The method of claim 16, wherein transferring said non-monetary data associated with said private label account is from said cross-reference database table to said second processing platform, and wherein transferring said monetary data associated with said private label account is from said cross-reference database table to said second processing platform.

18. A payment card processing apparatus comprising:
a processor; and
a storage device in communication with said processor and storing instructions adapted to be executed by said processor to:
select a private label account maintained on a first processing platform for upgrade to a dual card accounts, aid private label account associated with an account holder and having associated monetary and non-monetary data;
determine that the account holder agrees to terms associated with the dual card account;
create said dual card account with a zero balance on a second processing platform in response to the determining that the account holder agrees to the terms;
extract the associated monetary and non-monetary data from a private label database associated with said private label account and said first processing platform;
transfer said non-monetary data associated with said private label account from said first processing platform t~ said second processing platform for association with said dual card account;
cause a dual card associated with said dual card account to be transmitted to said account holder, said dual card and said dual card account being inactive until activated;
transfer said monetary data associated with said private label account from said first processing platform to said second processing platform for association with said dual card account in response to an activation of said dual card and said dual card account;
blocking said private label account from further use; and
initiating a trailing activity process to identify monetary and non-monetary activity associated with said private label account, wherein said initiating of said trailing activity process includes updating a cross reference table associating said private label account with said dual card account to include the monetary and non-monetary activity identified by trailing activity process.

19. A payment card processing system, comprising:
means for selecting a private label account maintained on a first processing platform for upgrade to a dual card account, said private label account associated with an account holder and having associated monetary and non-monetary data;
means for determining that the account holder agrees to terms associated with the dual card account:
means for creating said dual card account with a dual account identifier and a zero balance on a second processing platform that is separate and distinct from said first processing platform in response to the determining that the account holder agrees to the terms;
means for extracting the associated monetary and non-monetary data from a private label database associated with said private label account;
means for transferring said non-monetary data associated with said private label account from said first processing platform to said second processing platform for association with said dual card account;
means for causing a dual card associated with said dual card account to be transmitted to said account holder, said dual card and said dual card account being inactive until activated;
means for transferring said monetary data associated with said private label account from the cross-reference database table from said first processing platform to said second processing platform for association with said dual card account in response to an activation of said dual card and said dual card account;
means for blocking said private label account from further use: and
means for initiating a trailing activity process to identify monetary and non-monetary activity associated with said private label account, wherein said initiating of said trailing activity process includes updating a cross reference table associating said private label account with said dual card account to include the monetary and non-monetary activity identified by trailing activity process.

20. A non-transitory medium storing instructions adapted to be executed by a processor to perform a payment card processing method comprising:
instructions for selecting a private label account maintained on a first processing platform for upgrade to a dual card account, said private label account associated with an account holder and having associated monetary and non-monetary data;

instructions for determining that the account holder agrees to terms associated with the dual card account;

instructions for creating said dual card account with a dual account identifier and a zero balance on a second processing platform in response to the determining that the account holder agrees to the terms;

instructions for extracting the associated monetary and non-monetary data from a private label database associated with said private label account;

instructions for transferring said non-monetary data associated with said private label account from said first processing platform to said second processing platform for association with said dual card account;

instructions for causing a dual card associated with said dual card account to be transmitted to said account holder, said dual card and said dual card account being inactive until activated;

instructions for transferring said monetary data associated with said private label account from said first processing platform to said second processing platform for association with said dual card account;

instructions for blocking said private label account from further use; and instructions for initiating a trailing activity process to identify monetary and non-monetary activity associated with said private label account, wherein said initiating of said trailing activity process includes updating a cross reference table associating said private label account with said dual card account to include the monetary and non-monetary activity identified by trailing activity process.

* * * * *